US011425700B2

(12) United States Patent
Matsumura et al.

(10) Patent No.: US 11,425,700 B2
(45) Date of Patent: Aug. 23, 2022

(54) USER TERMINAL

(71) Applicant: NTT DOCOMO, INC., Tokyo (JP)

(72) Inventors: Yuki Matsumura, Tokyo (JP); Kazuki Takeda, Tokyo (JP); Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/051,965

(22) PCT Filed: May 2, 2018

(86) PCT No.: PCT/JP2018/017560
§ 371 (c)(1),
(2) Date: Oct. 30, 2020

(87) PCT Pub. No.: WO2019/211915
PCT Pub. Date: Nov. 7, 2019

(65) Prior Publication Data
US 2021/0136749 A1 May 6, 2021

(51) Int. Cl.
*H04L 5/00* (2006.01)
*H04W 72/12* (2009.01)
*H04W 72/04* (2009.01)

(52) U.S. Cl.
CPC ......... *H04W 72/0413* (2013.01); *H04L 5/001* (2013.01); *H04L 5/0053* (2013.01); *H04W 72/12* (2013.01)

(58) Field of Classification Search
CPC .................. H04L 5/0053; H04W 72/0413; H04W 72/12; H05L 5/001

USPC ......................................................... 370/329
See application file for complete search history.

(56) References Cited

U.S. PATENT DOCUMENTS

2013/0188590 A1* 7/2013 Aiba .................... H04W 72/04
370/329

OTHER PUBLICATIONS

International Search Report issued in PCT/JP2018/017560 dated Jun. 5, 2018 (2 pages).
Written Opinion of the International Searching Authority issued in PCT/JP2018/017560 dated Jun. 5, 2018 (4 pages).
(Continued)

*Primary Examiner* — Angel T Brockman
(74) *Attorney, Agent, or Firm* — Osha Bergman Watanabe & Burton LLP

(57) ABSTRACT

A terminal is disclosed including a processor that determines a single resource set among a plurality of resource sets configured based on higher layer signaling and that determines a transmission resource for an uplink control channel from the single resource set based on a field value in downlink control information; and a transmitter that transmits uplink control information by using the uplink control channel, wherein when a higher layer parameter corresponding to a maximum number of uplink control channel resources per resource set is applied to all the plurality of resource sets and when the maximum number exceeds a given value, the maximum number of uplink control channel resources per resource set other than a specific resource set is the given value. In another aspect, a radio communication method is also disclosed.

7 Claims, 8 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Patent Application No. 18917507.8, dated Nov. 25, 2021 (5 pages).

* cited by examiner

FIG. 2A

| PUCCH RESOURCE | PREDETERMINED FIELD VALUE IN DCI |
|---|---|
| PUCCH RESOURCE #0 | 000 |
| PUCCH RESOURCE #1 | 001 |
| PUCCH RESOURCE #2 | 010 |
| PUCCH RESOURCE #3 | 011 |
| PUCCH RESOURCE #4 | 100 |
| PUCCH RESOURCE #5 | 101 |
| PUCCH RESOURCE #6 | 110 |
| PUCCH RESOURCE #7 | 111 |

FIG. 2B

| PUCCH RESOURCE | PREDETERMINED FIELD VALUE IN DCI |
|---|---|
| PUCCH RESOURCE #0 | 000 |
| PUCCH RESOURCE #1 | 001 |
| PUCCH RESOURCE #2 | 010 |
| PUCCH RESOURCE #3 | 011 |

FIG. 2C

| PUCCH RESOURCE | PREDETERMINED FIELD VALUE IN DCI |
|---|---|
| PUCCH RESOURCE #0 | 000 |

USER TERMINAL

TECHNICAL FIELD

The present disclosure relates to a user terminal in a next-generation mobile communication system.

BACKGROUND ART

Long Term Evolution (LTE) has been standardized to achieve higher data rates, lower delay, and so on in UMTS (Universal Mobile Telecommunications System) networks (NPL 1). Further, successor systems to LTE (also referred to as, for example, LTE-A (LTE-Advanced), FRA (Future Radio Access), 4G, 5G, 5G+ (plus), NR (New RAT), LTE Rel. 14, 15, and later versions, and the like) are also under study to achieve wider bands and higher speeds than LTE.

In existing LTE systems (for example, LTE Rel. 8 to 13), downlink (DL) and/or uplink (UL) communication is performed by using a subframe (also referred to as transmission time interval (TTI) or the like) of 1 ms. The subframe is a transmission time unit of one channel-coded data packet and is a unit of processing such as scheduling, link adaptation, and retransmission control (HARQ: Hybrid Automatic Repeat reQuest).

In existing LTE systems (for example, LTE Rel. 8 to 13), furthermore, a user terminal transmits uplink control information (UCI) by using an uplink control channel (for example, PUCCH: Physical Uplink Control Channel) or an uplink shared channel (for example, PUSCH: Physical Uplink Shared Channel). The configuration (format) of the uplink control channel is referred to as PUCCH format or the like.

CITATION LIST

Non Patent Literature

NPL 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is being studied that, in future radio communication systems (for example, LTE Rel. 15 and later versions, 5G, 5G+, NR, and the like), in the case of transmission of UCI using an uplink control channel (for example, PUCCH), a resource for the uplink control channel (for example, a PUCCH resource) is determined based on the higher layer signaling and a given (predetermined) field value in downlink control information (DCI).

Specifically, in future radio communication systems, when one or more sets (PUCCH resource sets) each including a PUCCH resource are to be reported (configured) to a user terminal by using higher layer signaling, the user terminal is assumed to determine a PUCCH resource to be used for the transmission of UCI, based on a given field value in DCI, from within a PUCCH resource set selected based on the payload size (the number of bits) of the UCI.

However, limiting the number of PUCCH resources included in a PUCCH resource set to a certain value or more may increase the complexity of processing, resulting in increased load.

It is one of the objects of the present disclosure to provide a user terminal capable of configuring an uplink control channel resource set including a suitable number of uplink control channel resources.

Solution to Problem

A user terminal according to an aspect of the present disclosure includes a transmitting section that transmits uplink control information by using an uplink control channel, and a control section that determines a single resource set from among a plurality of resource sets configured based on higher layer signaling and that determines a transmission resource to be used for the uplink control channel from within the single resource set based on a given field value in downlink control information. When a higher layer parameter corresponding to a maximum number of uplink control channel resources per resource set is applied to all the plurality of resource sets and when the maximum number exceeds a given value, the control section determines that the maximum number of uplink control channel resources per resource set other than a specific resource set is the given number.

Advantageous Effects of Invention

According to the present disclosure, it is possible to configure an uplink control channel resource set including a suitable number of uplink control channel resources.

BRIEF DESCRIPTION OF DRAWINGS

FIG. 2A to FIG. 2C are diagrams illustrating example tables indicating the association between PUCCH resources and given field values in DCI.

DESCRIPTION OF EMBODIMENTS

Figure 1:
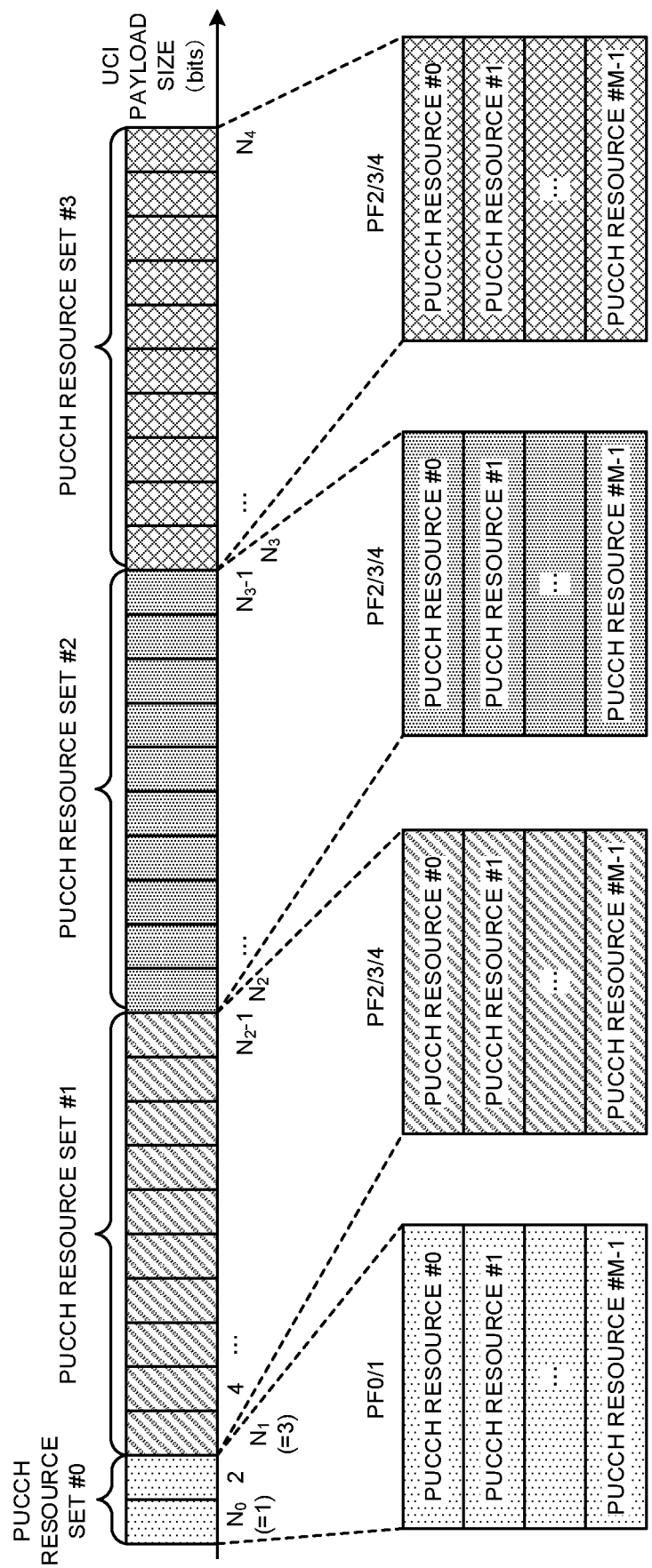
FIG. 1 is a diagram illustrating an example of allocation of PUCCH resources.

In future radio communication systems (for example, LTE Rel. 15 and later versions, 5G, NR, and the like), a configuration (also referred to as format, PUCCH format (PF), or the like) for an uplink control channel (for example, PUCCH) to be used for the transmission of UCI is under study. For example, it is being studied that LTE Rel. 15 supports five PFs 0 to 4. The names of the PFs given below are merely an example, and different names may be used.

For example, PFs 0 and 1 are PFs to be used for the transmission of UCI of up to 2 bits (also referred to as, for example, delivery confirmation information (HARQ-ACK: Hybrid Automatic Repeat reQuest-Acknowledge, ACK or NACK, or the like)). PF 0, which can be allocated across 1 or 2 symbols, is also referred to as short PUCCH, sequence-based short PUCCH, or the like. In contrast, PF 1, which can be allocated across 4 to 14 symbols, is also referred to as long PUCCH or the like. In PF 1, block-wise spreading may be performed in the time domain by using at least one of CS and OCC to multiplex a plurality of user terminals using code division multiplexing (CDM) within the same PRB.

PFs 2 to 4 are PFs to be used for the transmission of UCI of more than 2 bits (for example, channel state information (CSI) (or CSI and HARQ-ACK and/or scheduling request (SR))). PF 2, which can be allocated across 1 or 2 symbols, is also referred to as short PUCCH or the like. In contrast, PFs 3 and 4, which can be allocated across 4 to 14 symbols, is also referred to as long PUCCH or the like. In PF 4, block-wise spreading prior to DFT (frequency domain) may be used to multiplex a plurality of user terminals using CDM.

The allocation of resources (for example, PUCCH resources) to be used for the transmission of the uplink control channel is performed by using higher layer signaling and/or downlink control information (DCI). The higher layer signaling may be, for example, at least one of RRC (Radio Resource Control) signaling, system information (for example, at least one of RMSI: Remaining Minimum System Information, OSI: Other system information, MIB: Master Information Block, and SIB: System Information Block), and broadcast information (PBCH: Physical Broadcast Channel).

Specifically, one or more sets (PUCCH resource sets) each including one or more PUCCH resources are reported (configured) to a user terminal by using higher layer signaling. For example, K (for example, 1≤K≤4) PUCCH resource sets may be reported to a user terminal from a radio base station. Each PUCCH resource set may include M (for example, 8≤M≤32) PUCCH resources.

The user terminal may determine a single PUCCH resource set from among the K configured PUCCH resource sets based on the payload size of the UCI (UCI payload size). The UCI payload size may be the number of bits of the UCI including no cyclic redundancy check (CRC) bit.

The user terminal may determine a PUCCH resource to be used for the transmission of UCI from among M PUCCH resources included in the determined PUCCH resource set based on at least one of DCI and implicit information (also referred to as implicit indication information, an implicit index, or the like).

FIG. 1 is a diagram illustrating an example of allocation of PUCCH resources. In FIG. 1, as an example, K=4, and four PUCCH resource sets #0 to #3 are configured to a user terminal from a radio base station by using higher layer signaling. In addition, each of the PUCCH resource sets #0 to #3 includes M (for example, 8≤M≤32) PUCCH resources #0 to #M−1. The numbers of PUCCH resources included in the respective PUCCH resource sets may be the same or different.

In FIG. 1, each PUCCH resource configured to the user terminal may include a value of at least one of the parameters (also referred to as fields, information, or the like) below. A range of values that each of the parameters can accept may be defined for each PUCCH format.

The symbol at which PUCCH allocation starts (starting symbol)

The number of symbols allocated for PUCCH within a slot (time duration allocated for PUCCH)

The index of the resource block at which PUCCH allocation starts (physical resource block (PRB))

The number of PRBs allocated for PUCCH

Whether to enable frequency hopping for PUCCH

The indices of a frequency resource of the second hop when frequency hopping is enabled, and an initial cyclic shift (CS: Cyclic Shift)

The index of a time-domain orthogonal spreading code (for example, OCC: Orthogonal Cover Code), and the length of the OCC to be used for block-wise spreading prior to discrete Fourier transform (DFT) (also referred to as OCC length, spreading factor, or the like)

The index of the OCC to be used for block-wise spreading after DFT

As illustrated in FIG. 1, in a case where the PUCCH resource sets #0 to #3 are configured to a user terminal, the user terminal selects any PUCCH resource set based on the UCI payload size.

For example, when the UCI payload size is 1 or 2 bits, the PUCCH resource set #0 is selected. When the UCI payload size is greater than or equal to 3 bits and less than or equal to $N_2-1$ bits, the PUCCH resource set #1 is selected. When the UCI payload size is greater than or equal to $N_2$ bits and less than or equal to $N_3-1$ bits, the PUCCH resource set #2 is selected. Likewise, when the UCI payload size is greater than or equal to $N_3$ bits and less than or equal to $N_4-1$ bits, the PUCCH resource set #3 is selected.

In this way, the range of the UCI payload size for which the PUCCH resource set #i (i=0, . . . , K−1) is selected is represented as being greater than or equal to $N_i$ bits and less than or equal to $N_{i+1}-1$ bits (i.e., $\{N_i, \ldots, N_{i+1}-1\}$ bits).

The starting positions (start bit numbers) $N_0$ and $N_1$ of the UCI payload sizes for the PUCCH resource sets #0 and #1 may be 1 and 3, respectively. Accordingly, the PUCCH resource set #0 is selected for the transmission of UCI of up to 2 bits. Thus, the PUCCH resource set #0 may include PUCCH resources #0 to #M−1 for at least one of PF 0 and PF 1. In contrast, any of the PUCCH resource sets #1 to #3 is selected for the transmission of UCI of more than 2 bits. Thus, each of the PUCCH resource sets #1 to #3 may include PUCCH resources #0 to #M−1 for at least one of PF 2, PF3, and PF 4.

When i=2, . . . , K−1, information (starting position information) indicating the starting position ($N_i$) of the payload size of UCI for the PUCCH resource set #i may be reported (configured) to the user terminal by using higher layer signaling. The starting position ($N_i$) may be user-terminal-specific. For example, the starting position ($N_i$) may be set to a value in the range of greater than or equal to 4 bits and less than or equal to 256 bits (for example, a multiple of 4). For example, in FIG. 1, information indicating the starting positions ($N_2$ and $N_3$) of the UCI payload sizes for the PUCCH resource sets #2 and #3 is reported to the user terminal by using higher layer signaling (for example, user-specific RRC signaling).

The maximum payload size of UCI for each PUCCH resource set is given by $N_K-1$. $N_K$ may be explicitly reported (configured) to the user terminal by using higher layer signaling and/or DCI or may be implicitly derived. For example, in FIG. 1, it may be defined by the specifications that $N_0=1$ and $N_1=3$, and $N_2$ and $N_3$ may be reported by using higher layer signaling. Further, $N_4$ may be defined by the specifications (for example, $N_4=1000$).

In the case illustrated in FIG. 1, the user terminal is able to determine a single PUCCH resource to be used for the transmission of UCI, based on a value of a given field in DCI, from among the PUCCH resources #0 to #M−1 included in the PUCCH resource set selected based on the UCI payload size.

The number M of PUCCH resources in one PUCCH resource set may be configured to the user terminal by using higher layer signaling.

A PUCCH resource in a PUCCH resource set may be reported by using a 3-bit field in DCI.

It is being studied that, in NR, M is 8 to 32 for PF 0/1. It is also being studied that M is 8 for PF 2/3/4. For example, it is being studied that M is 8 to 32 for the PUCCH resource set #0 (which may also be referred to as first PUCCH resource set) and that M is 8 for the PUCCH resource sets #1 to #3 (which may also be referred to as second, third, and fourth PUCCH resource sets, respectively).

However, in a case where it is sufficient even if the number of PUCCH resources in a single PUCCH resource set is smaller than 8, limiting the number of PUCCH resources to a minimum value of M may increase the complexity and load of a network (NW, gNB, or a radio base station).

Accordingly, the present inventors have conceived of a method for flexibly configuring the number of PUCCH resources in a single PUCCH resource set. This method can simplify the NW's scheduler and reduce the complexity and load of the NW. In addition, the overhead (the number of bits) of higher layer signaling (for example, RRC signaling) for configuring a PUCCH resource set can be reduced.

The following describes an embodiment according to the present disclosure in detail with reference to the drawings.

In the following, it is assumed, but not limited to, that PUCCH resources in each PUCCH resource set are explicitly reported (configured) to a user terminal from a radio base station by using higher layer signaling. For example, at least one PUCCH resource in at least one PUCCH resource set may be determined in advance by the specifications or may be derived by the user terminal.

Furthermore, the following mainly describes a case where (but not limited to) the number of bits (x) in a given field in DCI to be use for the determination of a PUCCH resource is 3. The following aspects are applicable to a case where a single PUCCH resource set selected from within K PUCCH resource sets based on the UCI payload size includes PUCCH resources, the number of which is larger than 2 raised to the X-th power (i.e., a case where M>2^X).

Further, the given field with x bits may also be referred to as PUCCH resource indicator field, ACK/NACK resource indicator (ARI) field, ACK/NACK resource offset (ARO) field, TPC command field, or the like.

Further, UCI may include at least one of delivery confirmation information (also referred to as, for example, retransmission control information, HARQ-ACK (Hybrid Automatic Repeat reQuest-Acknowledge), ACK/NACK (Acknowledge/Non-Acknowledge), or the like) for a downlink shared channel (for example, PDSCH: Physical Downlink Shared Channel), a scheduling request (SR) for an uplink shared channel (for example, PUSCH), and channel state information (CSI).

(First Aspect)

In a first aspect, the number M of PUCCH resources included in a PUCCH resource set configured by using higher layer signaling (for example, RRC signaling) may be smaller than 8.

For all the K PUCCH resource sets configured by using higher layer signaling, M may be less than 8.

A maximum number of PUCCH resources per PUCCH resource set (for example, maxNrofPUCCH-ResourcesPer-Set) may be configured, an RRC information element (for example, PUCCH-ResourceSet) for configuring a PUCCH resource set may include a sequence of PUCCH resource IDs, and the minimum number of the number M of elements in the sequence may not be 8. For example, the minimum number of the number M of elements in the sequence may be 0 or 1, or may be any other value smaller than 8, such as 2 or 4. For example, it may be defined in the specifications that the number M of elements in the sequence (the size of the sequence) is from 0 to maxNrofPUCCH-ResourcesPerSet.

The maximum number of PUCCH resources per PUCCH resource set (for example, maxNrofPUCCH-ResourcesPerSet) is not limited to 32. The maximum number of PUCCH resources per PUCCH resource set may be defined as at least one value greater than or equal to 0 and less than 32 (for example, greater than or equal to 0 and less than or equal to a given value (for example, 8)) by the specifications, or may be configured by using RRC signaling.

In the present disclosure, the "given value" may be represented by, for example, 2 raised to the n-th power (n depends on the number of bits in a field indicating a PUCCH resource in DCI). The "given value" may be 2, 4, 8, 16, or the like.

UE may apply the maximum number of PUCCH resources per PUCCH resource set, which is a higher layer parameter, not only to a specific PUCCH resource set (for example, the first PUCCH resource set) but also to all the PUCCH resource sets (for example, the first, second, third, and fourth PUCCH resource sets). That is, UE may assume that the maximum numbers of PUCCH resources included in the respective PUCCH resource sets are indicated in common by a single parameter (maxNrofPUCCH-ResourcesPerSet).

When applying the maximum number of PUCCH resources per PUCCH resource set to all the PUCCH resource sets, UE may determine that the maximum number of PUCCH resources per specific PUCCH resource set (for example, the first PUCCH resource set) is the maximum number, regardless of whether the maximum number is less than or equal to the given value (for example, 8).

When applying the maximum number of PUCCH resources per PUCCH resource set to all the PUCCH resource sets, UE may determine that, if the maximum number is less than or equal to the given value (for example, 8), the maximum number of PUCCH resources per PUCCH resource set (for example, the second, third, and fourth PUCCH resource sets) other than the specific PUCCH resource set is the maximum number.

Even when applying the maximum number of PUCCH resources per PUCCH resource set to all the PUCCH resource sets, UE may determine that the maximum number of PUCCH resources per PUCCH resource set (for example, the second, third, and fourth PUCCH resource sets) other than the specific PUCCH resource set is the given value if the maximum number exceeds the given value (for example, 8).

The first PUCCH resource set may be a resource set for PF 0/1. The second, third, and fourth PUCCH resource sets may be resource sets for non-PF 0/1 (for example, for PF 2/3/4).

The maximum number of PUCCH resources per PUCCH resource set may be defined for each PUCCH resource set by the specifications, or may be configured by using RRC signaling. For example, the maximum numbers of PUCCH resources for the first, second, third, and fourth PUCCH resource sets may be respectively represented by the maximum number of PUCCH resources per first PUCCH resource set (which may also be referred to as information element "maxNrofPUCCH-ResourcesPerSet", "maxNrof-PUCCH-ResourcesPerSet1", or the like), the maximum number of PUCCH resources per second PUCCH resource set (which may also be referred to as information element "maxNrofPUCCH-ResourcesPerSet2" or the like), the maximum number of PUCCH resources per third PUCCH resource set (which may also be referred to as information element "maxNrofPUCCH-ResourcesPerSet3" or the like), and the maximum number of PUCCH resources per fourth PUCCH resource set (which may also be referred to as information element "maxNrofPUCCH-ResourcesPerSet4" or the like).

If the maximum number of PUCCH resources per second PUCCH resource set exceeds the given value (for example, 8), UE may determine that the maximum number of PUCCH resources per second PUCCH resource set is the given value.

If the maximum number of PUCCH resources per third PUCCH resource set exceeds the given value (for example, 8), UE may determine that the maximum number of PUCCH resources per third PUCCH resource set is the given value.

If the maximum number of PUCCH resources per fourth PUCCH resource set exceeds the given value (for example, 8), UE may determine that the maximum number of PUCCH resources per fourth PUCCH resource set is the given value.

In the first aspect, setting the number of PUCCH resources in a PUCCH resource set to be smaller than 8 can reduce the complexity and load of a NW.

(Second Aspect)

In a second aspect, DCI and PUCCH resources may be associated with each other.

If the number M of PUCCH resources included in the specific PUCCH resource set is smaller than 8 (where M is any of 0 to 7), the association of a value of the given field in DCI and a PUCCH resource may be configured or may be defined by the specifications.

UE does not predict (does not assume), for the number M of PUCCH resources in a PUCCH resource set that is configured by using higher layer signaling and that is selected based on the UCI length, a value in the given field corresponding to a PUCCH resource ID of greater than or equal to M. For example, if M is set to 4, UE does not predict a value of greater than or equal to 4 in the given field since values (PUCCH resource ID) that the given field can accept are 0 to 3.

For the number M of PUCCH resources in a selected PUCCH resource set, upon detection of DCI having a value in the given field corresponding to a PUCCH resource ID of greater than or equal to M (a PUCCH resource ID not included in the selected PUCCH resource set), UE may ignore the given field (may not use the given field).

For several numbers of PUCCH resources, tables of the association of PUCCH resources and given field values may be configured or may be defined by the specifications. The tables may be held in advance in at least one of UE and gNB. The configured, defined, or held tables may be tables for all M that can be configured, or may be tables for some M that can be configured.

For example, as illustrated in FIG. 2A, FIG. 2B, and FIG. 2C, tables with the given field length being 3 bits and M being 8, 4, and 1 may be held in advance in UE and gNB. For example, as illustrated in FIG. 2A and FIG. 2B, in each table, entries may indicate the corresponding values in the given field in ascending order of PUCCH resource IDs. In the table with M being 4, the given field length may be 2 bits. In the table with M being 1, the given field length may be 1 bit. The table with M being 1 may not include a value in the given field and may indicate a single PUCCH resource. In this case, UE may determine the single PUCCH resource indicated in the table, regardless of DCI. A table with M being 2 may be held in advance in UE and gNB. In this case, the given field length may be 1 bit.

The given field length may differ in accordance with the number of PUCCH resources included in a PUCCH resource set configured by using higher layer signaling, or in accordance with the number of PUCCH resources in a PUCCH resource set that is configured by using higher layer signaling and that is selected based on the UCI length. If the numbers of PUCCH resources included in a plurality of PUCCH resource sets configured by using higher layer signaling are different, the given field length may be determined in accordance with the maximum value of the numbers of PUCCH resources included in the plurality of PUCCH resource sets configured by using higher layer signaling. The numbers of PUCCH resources included in the plurality of PUCCH resource sets configured by using higher layer signaling may be equal.

At least one of the number of PUCCH resources included in a PUCCH resource set configured by using higher layer signaling, the maximum number of PUCCH resources included in each of a plurality of PUCCH resource sets configured by using higher layer signaling, and the number of PUCCH resources included in a PUCCH resource set that is configured by using higher layer signaling and that is selected based on the UCI length may be used as a target PUCCH resource set, and the given field length may be determined in accordance with the number of target PUCCH resources. If the number of target PUCCH resources is less than or equal to 2 raised to the n-th power, the given field length may be n. If the number of target PUCCH resources is 1, the given field length may be 0. If the number of target PUCCH resources is 2, the given field length may be 1. If the number of target PUCCH resources is 3 to 4, the given field length may be 2. If the number of target PUCCH resources is greater than 4, the given field length may be 3.

At least one of UE and gNB may hold only the table with M being 8, and the number M of PUCCH resources in the specific PUCCH resource set may be less than or equal to 8 or may be less than 8. UE may determine a PUCCH resource corresponding to a value in the given field by using the table. For example, if M of the selected PUCCH resource set is 4, a PUCCH resource corresponding to a received value in the given field is determined from among the PUCCH resources #0 to #3 in the table illustrated in FIG. 2A.

In place of the given field, a combination of the given field and implicit indication information may be used. In this case, in each table, a PUCCH resource ID may be associated with a combination of a value in the given field and a value in the implicit indication information.

In the second aspect, UE can appropriately determine a PUCCH resource based on DCI even if the number M of PUCCH resources in a PUCCH resource set configured by using higher layer signaling is smaller than 8.

(Radio Communication System)

The following describes the configuration of a radio communication system according to this embodiment. In the radio communication system, the radio communication methods according to the respective aspects described above are applied. The radio communication methods according to the respective aspects described above may be each applied alone, or at least two of them may be applied in combination.

Figure 3:
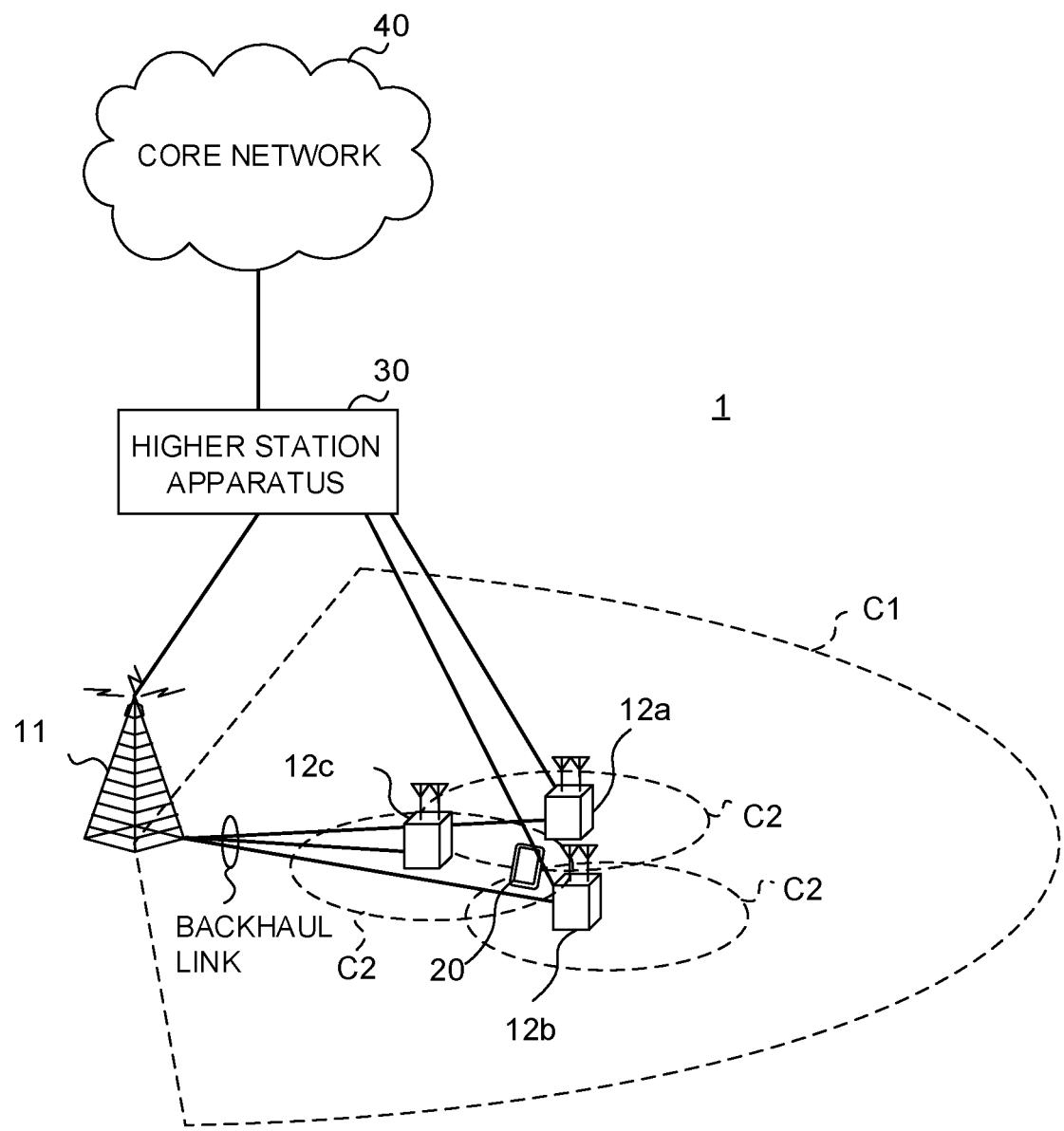
FIG. 3 is a diagram illustrating an example schematic configuration of a radio communication system according to this embodiment.

FIG. 3 is a diagram illustrating an example schematic configuration of a radio communication system according to this embodiment. A radio communication system 1 can adopt carrier aggregation (CA) and/or dual connectivity (DC) in which a plurality of fundamental frequency blocks (component carriers) are aggregated together, where one unit is the system bandwidth (for example, 20 MHz) of an LTE system. The radio communication system 1 may also be referred to as SUPER 3G, LTE-A (LTE-Advanced), IMT-Advanced, 4G, 5G, FRA (Future Radio Access), NR (New RAT: New Radio Access Technology), or the like.

The radio communication system 1 illustrated in this figure includes a radio base station 11 that forms a macro cell C1, and radio base stations 12*a* to 12*c* that are located in the macro cell C1 and that form small cells C2 narrower than the macro cell C1. Further, a user terminal 20 is located in the macro cell C1 and the small cells C2. The radio communication system 1 may be configured such that different numerologies are applied among cells and/or within a single cell.

As used here, a numerology refers to a communication parameter in the frequency direction and/or time direction (at least one of, for example, the spacing of subcarriers (subcarrier spacing), the bandwidth, the symbol length, the time length of CP (CP length), the subframe length, the time length of TTI (TTI length), the number of symbols per TTI, the radio frame configuration, the filtering process, the windowing process, and so on). The radio communication system 1 may support a subcarrier spacing of, for example, 15 kHz, 30 kHz, 60 kHz, 120 kHz, 240 kHz, or the like.

The user terminal 20 is capable of connecting to both the radio base station 11 and the radio base stations 12. The user terminal 20 is assumed to simultaneously use the macro cell C1 and the small cells C2, which use different frequencies, by means of CA or DC. Further, the user terminal 20 is capable of applying CA or DC by using a plurality of cells (CCs) (for example, two or more CCs). Further, the user terminal is capable of utilizing a licensed band CC and an unlicensed band CC as a plurality of cells.

Further, the user terminal 20 is capable of performing communication using, at each cell, time division duplex (TDD) or frequency division duplex (FDD). A cell with TDD and a cell with FDD may be referred to as TDD carrier (frame configuration type 2) and an FDD carrier (frame configuration type 1) or the like, respectively.

In each cell (carrier), a single numerology or a plurality of different numerologies may be applied.

The user terminal 20 and the radio base station 11 are capable of communication by using a carrier (referred to as existing carrier, Legacy carrier, or the like) having a narrow bandwidth in a relatively low frequency band (for example, 2 GHz). On the other hand, the user terminal 20 and the radio base stations 12 may use a carrier having a wide bandwidth in a relatively high frequency band (for example, 3.5 GHz, 5 GHz, 30 to 70 GHz, or the like), or may use the same carrier as that used between the user terminal 20 and the radio base station 11. The configuration of a frequency band used by each radio base station is not limited thereto.

The radio base station 11 and each of the radio base stations 12 (or two radio base stations 12) can be configured to be connected via wired (for example, a CPRI (Common Public Radio Interface)-compliant optical fiber, an X2 interface, or the like) or wirelessly.

The radio base station 11 and the radio base stations 12 are connected to a higher station apparatus 30 and are connected to a core network 40 via the higher station apparatus 30. The higher station apparatus 30 includes, for example but not limited to, an access gateway apparatus, a radio network controller (RNC), a mobility management entity (MME), and so on. The radio base stations 12 may be connected to the higher station apparatus 30 via the radio base station 11.

The radio base station 11 is a radio base station with relatively wide coverage and may also be referred to as macro base station, aggregation node, eNB (eNodeB), gNB (gNodeB), transmission/reception point (TRP), or the like. Each of the radio base stations 12 is a radio base station with local coverage and may also be referred to as small base station, micro base station, pico base station, femto base station, HeNB (Home eNodeB), RRH (Remote Radio Head), eNB, gNB, transmission/reception point, or the like. Hereinafter, the radio base stations 11 and 12 are collectively referred to as radio base station 10 if they are not distinguished from each other.

Each user terminal 20 is a terminal supporting various communication schemes such as LTE, LTE-A, 5G, and NR, examples of which may include a mobile communication terminal and a fixed communication terminal. The user terminal 20 is also capable of device-to-device communication (D2D) with any other user terminal 20.

In the radio communication system 1, as radio access schemes, OFDMA (orthogonal frequency division multiple access) is applicable to the downlink (DL), and SC-FDMA (single carrier-frequency division multiple access) is applicable to the uplink (UL). OFDMA is a multi-carrier transmission scheme in which a frequency band is divided into a plurality of narrow frequency bands (subcarriers) such that data is mapped to each subcarrier to perform communication. SC-FDMA is a single carrier transmission scheme in which a system bandwidth is divided into bands each having a single resource block or consecutive resource blocks for each terminal such that a plurality of terminals use different bands to reduce interference between the terminals. The uplink and downlink radio access schemes are not limited to the combination described above, and OFDMA may be used in the UL.

In the radio communication system 1, a multi-carrier waveform (for example, an OFDM waveform) or a single carrier waveform (for example, DFT-s-OFDM waveform) may be used.

The radio communication system 1 may use, as a DL channel, a DL shared channel (also referred to as PDSCH: Physical Downlink Shared Channel, DL data channel, or the like), which is shared by user terminals 20, a broadcast channel (PBCH: Physical Broadcast Channel), an L1/L2 control channel, or the like. The PDSCH transmits user data, higher layer control information, an SIB (System Information Block), and so on. The PBCH transmits an MIB (Master Information Block).

The L1/L2 control channel includes DL control channels (a PDCCH (Physical Downlink Control Channel) and an EPDCCH (Enhanced Physical Downlink Control Channel)), a PCFICH (Physical Control Format Indicator Channel), a PHICH (Physical Hybrid-ARQ Indicator Channel), and so on. The PDCCH transmits downlink control information (DCI) including scheduling information of the PDSCH and the PUSCH, and so on. The PCFICH transmits the number of OFDM symbols to be used in the PDCCH. The EPDCCH is frequency division multiplexed with the PDSCH and is used for the transmission of DCI and so on, like the PDCCH. At least one of the PHICH, the PDCCH, and the EPDCCH can transmit HARQ retransmission control information (ACK/NACK) for the PUSCH.

The radio communication system 1 uses, as a UL channel, a UL shared channel (also referred to as PUSCH: Physical Uplink Shared Channel, uplink shared channel, or the like), which is shared by user terminals 20, an uplink control channel (PUCCH: Physical Uplink Control Channel), a random access channel (PRACH: Physical Random Access Channel), or the like. The PUSCH transmits user data and higher layer control information. Uplink control information (UCI) including at least one of retransmission control information (A/N) for a DL signal, channel state information (CSI), and so on is transmitted on the PUSCH or the PUCCH. The PRACH can transmit a random access preamble for establishing a connection with a cell.

<Radio Base Station>

Figure 4:
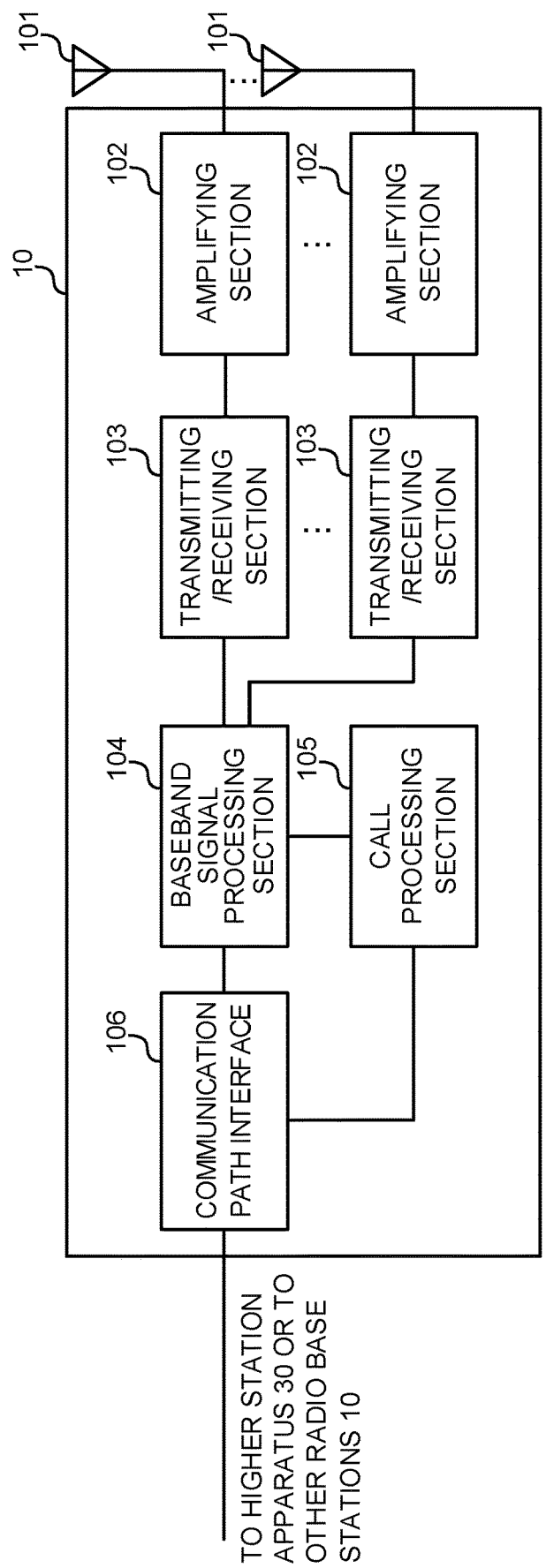
FIG. 4 is a diagram illustrating an example overall configuration of a radio base station according to this embodiment.

FIG. 4 is a diagram illustrating an example overall configuration of a radio base station according to this embodiment. The radio base station 10 includes a plurality of transmit/receive antennas 101, amplifying sections 102, transmitting/receiving sections 103, a baseband signal processing section 104, a call processing section 105, and a transmission path interface 106. The radio base station 10 may be configured to include one or more transmit/receive antennas 101, one or more amplifying sections 102, and one or more transmitting/receiving sections 103.

User data to be transmitted from the radio base station 10 to the user terminal 20 in the DL is input to the baseband signal processing section 104 from the higher station apparatus 30 via the transmission path interface 106.

In the baseband signal processing section 104, the user data is subjected to PDCP (Packet Data Convergence Protocol) layer processing, division and combination of user data, RLC layer transmission processing such as RLC (Radio Link Control) retransmission control, MAC (Medium Access Control) retransmission control (for example, HARQ (Hybrid Automatic Repeat reQuest) transmission processing), and transmission processing such as scheduling, transmission format selection, channel coding, inverse fast Fourier transform (IFFT) processing, and precoding processing, and is then transferred to the transmitting/receiving sections 103. A downlink control signal is also subjected to transmission processing, such as channel coding and inverse fast Fourier transform, and is then transferred to the transmitting/receiving sections 103.

Each of the transmitting/receiving sections 103 converts a baseband signal that is precoded for the corresponding antenna and output from the baseband signal processing section 104 into a radio frequency band and transmits a signal in the radio frequency band. The radio frequency signal, which is subjected to frequency conversion by the transmitting/receiving section 103, is amplified by the amplifying section 102 and is then transmitted from the transmit/receive antenna 101.

The transmitting/receiving section 103 can be constituted by a transmitter/receiver, a transmitting/receiving circuit, or a transmitting/receiving apparatus, which is described based on common recognition in the technical field to which the present invention pertains. The transmitting/receiving section 103 may be configured as an integrated transmitting/receiving section or may be constituted by a transmitting section and a receiving section.

As for a UL signal, on the other hand, a radio frequency signal received by the transmit/receive antenna 101 is amplified by the amplifying section 102. The transmitting/receiving section 103 receives the UL signal amplified by the amplifying section 102. The transmitting/receiving section 103 performs frequency conversion to convert the reception signal into a baseband signal and outputs the baseband signal to the baseband signal processing section 104.

In the baseband signal processing section 104, UL data contained in the input UL signal is subjected to reception processing, such as fast Fourier transform (FFT) processing, inverse discrete Fourier transform (IDFT) processing, error correction decoding, and MAC retransmission control, and RLC layer and PDCP layer reception processing, and is then transferred to the higher station apparatus 30 via the transmission path interface 106. The call processing section 105 performs call processing such as configuring and releasing of a communication channel, the management of the state of the radio base station 10, and the management of radio resources.

The transmission path interface 106 transmits and receives a signal to and from the higher station apparatus 30 via a given interface. The transmission path interface 106 may transmit and receive a signal (backhaul signaling) to and from a neighboring radio base station 10 via an inter-base-station interface (for example, a CPRI (Common Public Radio Interface)-compliant optical fiber or an X2 interface).

Further, the transmitting/receiving section 103 transmits a DL signal (including at least one of a DL data signal, a DL control signal, and a DL reference signal) to the user terminal 20 and receives a UL signal (including at least one of a UL data signal, a UL control signal, and a UL reference signal) from the user terminal 20.

Further, the transmitting/receiving section 103 receives UCI from the user terminal 20 by using an uplink shared channel (for example, PUSCH) or an uplink control channel (for example, short PUCCH and/or long PUCCH). The UCI may include at least one HARQ-ACK for a DL data channel (for example, PDSCH), CSI, SR, beam identification information (for example, a beam index (BI)), and a buffer status report (BSR).

Further, the transmitting/receiving section 103 may transmit uplink control channel (for example, short PUCCH, long PUCCH) related control information (for example, at least one of a format, the number of PUCCH units in a slot, the size of a PUCCH unit, a method for RS multiplexing, an RS position, the presence or non-presence of RS, the density of RS, the presence of SRS, and a resource for the uplink control channel) by using physical layer signaling (L1 signaling) and/or higher layer signaling.

Figure 5:
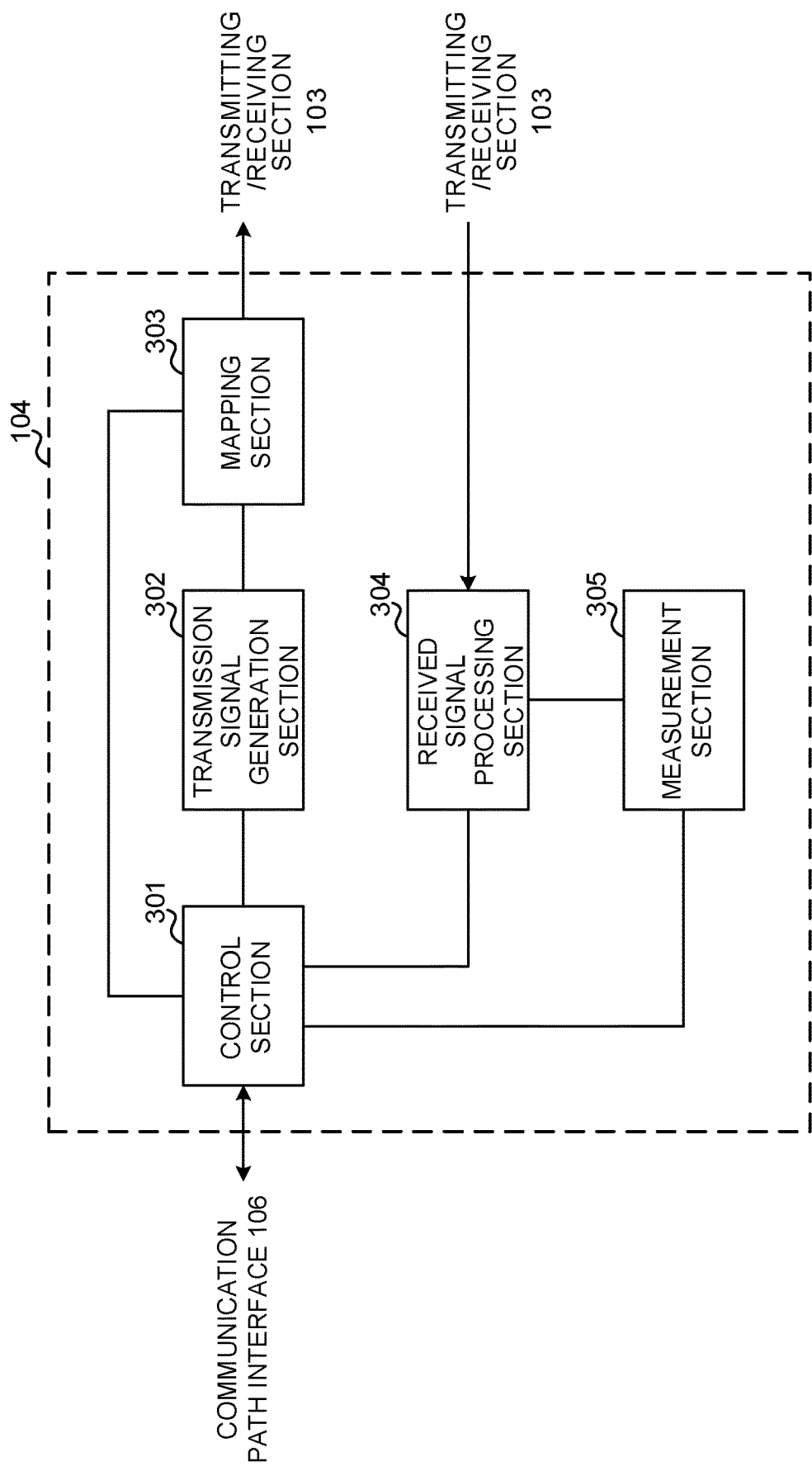
FIG. 5 is a diagram illustrating an example functional configuration of the radio base station according to this embodiment.

FIG. 5 is a diagram illustrating an example functional configuration of a radio base station according to this embodiment. In this figure, functional blocks that are characteristic portions of this embodiment are mainly illustrated, and the radio base station 10 also has other functional blocks required for radio communication. As illustrated in this figure, the baseband signal processing section 104 includes a control section 301, a transmission signal generating section 302, a mapping section 303, a reception signal processing section 304, and a measuring section 305.

The control section 301 performs overall control of the radio base station 10. The control section 301 controls, for example, the generation of a DL signal using the transmission signal generating section 302, the mapping of the DL signal using the mapping section 303, reception processing (for example, demodulation and so on) of the UL signal using the reception signal processing section 304, and measurement using the measuring section 305.

Specifically, the control section 301 performs scheduling of the user terminal 20. Specifically, the control section 301 may perform the scheduling and/or retransmission control of DL data and/or an uplink shared channel based on UCI (for example, CSI and/or BI) from the user terminal 20.

The control section 301 may also control the configuration (format) of an uplink control channel (for example, long PUCCH and/or short PUCCH) and perform control to transmit control information for the uplink control channel.

The control section 301 may also control the configuring of a PUCCH resource. Specifically, the control section 301 may perform control to configure K PUCCH resource sets each including M PUCCH resources to a user terminal based on the payload size of the UCI.

The control section 301 may also control reception processing of the UCI by using a PUCCH resource that is determined by a user terminal based on a given field value in DCI and/or based on implicit indication information. The control section 301 may control the blind detection of the PUCCH resource.

The control section 301 may control the reception signal processing section 304 to perform reception processing of UCI from the user terminal 20 based on the format of the uplink control channel.

Further, the control section 301 may configure a resource set (PUCCH resource set) to the user terminal 20 based on higher layer signaling (for example, RRC signaling), determine a transmission resource (PUCCH resource) to be used for the uplink control channel from within the resource set, and control transmission of downlink control information (DCI) having a given field value corresponding to the transmission resource. The number of resources included in the resource set may be smaller than 8.

The control section 301 can be constituted by a controller, a control circuit, or a control apparatus, which is described based on common recognition in the technical field to which the present invention pertains.

The transmission signal generating section 302 generates a DL signal (including a DL data signal, a DL control signal, and a DL reference signal) in accordance with an instruction from the control section 301, and outputs the DL signal to the mapping section 303.

The transmission signal generating section 302 can be a signal generator, a signal generation circuit, or a signal generation apparatus, which is described based on common recognition in the technical field to which the present invention pertains.

The mapping section 303 maps the DL signal generated by the transmission signal generating section 302 to a given radio resource in accordance with an instruction from the control section 301 and outputs the resulting signal to the transmitting/receiving section 103. The mapping section 303 can be a mapper, a mapping circuit, or a mapping apparatus, which is described based on common recognition in the technical field to which the present invention pertains.

The reception signal processing section 304 performs reception processing (for example, demapping, demodulation, decoding, and so on) on a UL signal (including, for example, a UL data signal, a UL control signal, and a UL reference signal) transmitted from the user terminal 20. Specifically, the reception signal processing section 304 may output a reception signal or a signal subjected to reception processing to the measuring section 305. Further, the reception signal processing section 304 performs reception processing of UCI based on the uplink control channel configuration indicated by the control section 301.

The measuring section 305 performs measurement of a signal that has been received. The measuring section 305 can be constituted by a measuring instrument, a measurement circuit, or a measurement apparatus, which is described based on common recognition in the technical field to which the present invention pertains.

The measuring section 305 may measure the channel quality of the UL based on, for example, the received power (for example, RSRP (Reference Signal Received Power)) and/or received quality (for example, RSRQ (Reference Signal Received Quality)) of the UL reference signal. The measurement result may be output to the control section 301.

<User Terminal>

Figure 6:
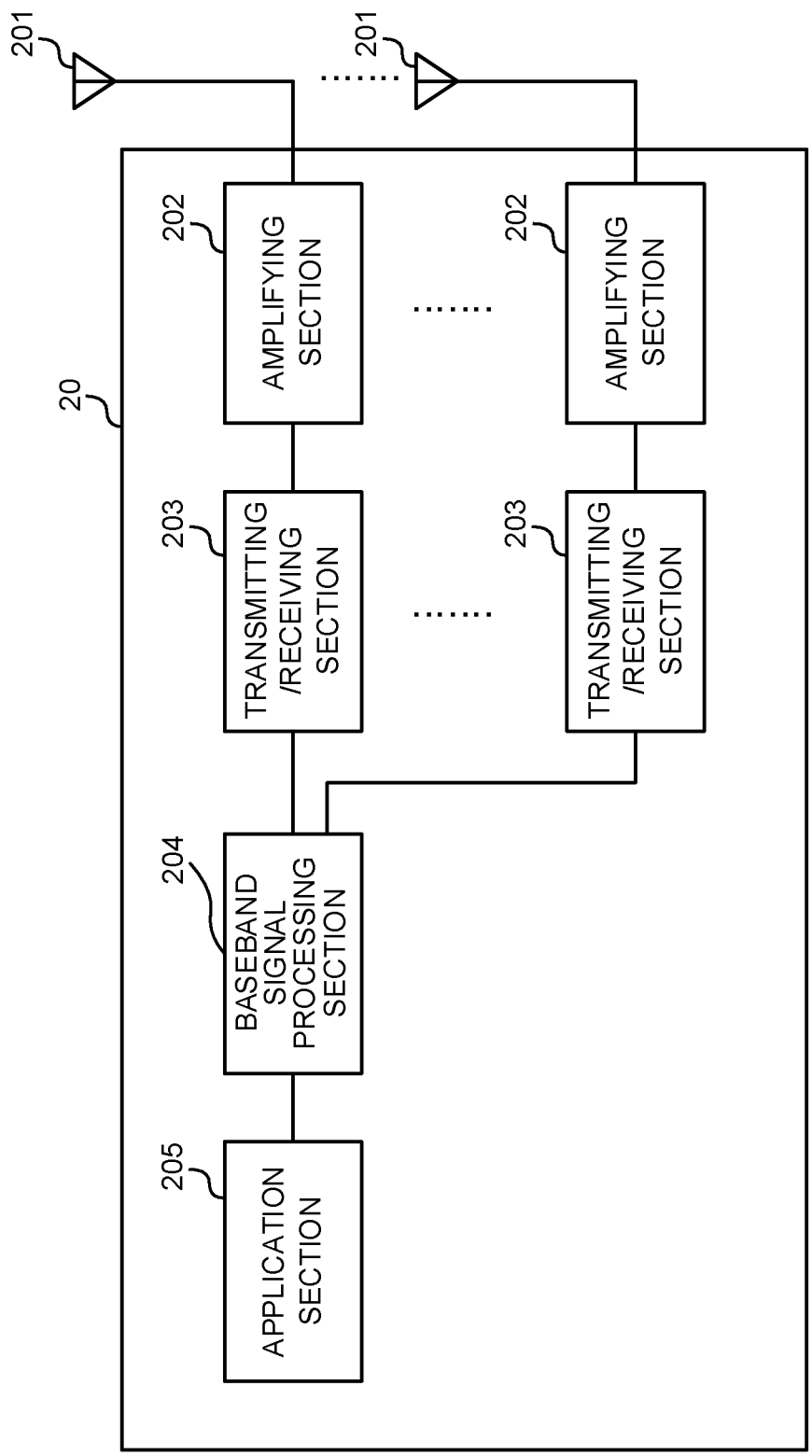
FIG. 6 is a diagram illustrating an example overall configuration of a user terminal according to this embodiment.

FIG. 6 is a diagram illustrating an example overall configuration of a user terminal according to this embodiment. The user terminal 20 includes a plurality of transmit/receive antennas 201 for MIMO transmission, amplifying sections 202, transmitting/receiving sections 203, a baseband signal processing section 204, and an application section 205.

Radio frequency signals received by the plurality of transmit/receive antennas 201 are amplified by the respective amplifying sections 202. Each of the transmitting/receiving sections 203 receives a DL signal amplified by a corresponding one of the amplifying sections 202. The transmitting/receiving section 203 performs frequency conversion to convert the reception signal into a baseband signal and outputs the baseband signal to the baseband signal processing section 204.

The baseband signal processing section 204 performs reception processing, such as FFT processing, error correction decoding, and retransmission control, on an input baseband signal. DL data is transferred to the application section 205. The application section 205 performs processing related to a layer higher than the physical layer or the MAC layer and other processing. Broadcast information is also transferred to the application section 205.

On the other hand, UL data is input from the application section 205 to the baseband signal processing section 204. In the baseband signal processing section 204, the UL data is subjected to retransmission control transmission processing (for example, HARQ transmission processing), channel coding, rate matching, puncturing, discrete Fourier transform (DFT) processing, IFFT processing, and so on, and is then transferred to the transmitting/receiving sections 203. UCI is also subjected to at least one of channel coding, rate matching, puncturing, DFT processing, and IFFT processing, and is then transferred to the transmitting/receiving sections 203.

Each of the transmitting/receiving sections 203 converts a baseband signal output from the baseband signal processing section 204 into a radio frequency band and transmits a signal in the radio frequency band. The radio frequency signal, which is subjected to frequency conversion by the transmitting/receiving section 203, is amplified by the amplifying section 202 and is transmitted from the transmit/receive antenna 201.

Each of the transmitting/receiving sections 203 further receives a DL signal (including a DL data signal, a DL control signal (DCI), and a DL reference signal) of a numerology configured by the user terminal 20 and transmits a UL signal (including a UL data signal, a UL control signal, and a UL reference signal) of the numerology.

The transmitting/receiving section 203 further transmits UCI to the radio base station 10 by using an uplink shared channel (for example, PUSCH) or an uplink control channel (for example, short PUCCH and/or long PUCCH).

The transmitting/receiving section 203 may further receive information indicating K PUCCH resource sets each including M PUCCH resources. The transmitting/receiving section 203 may further receive higher layer control information (higher layer parameters).

The transmitting/receiving section 203 can be a transmitter/receiver, a transmitting/receiving circuit, or a transmitting/receiving apparatus, which is described based on common recognition in the technical field to which the present invention pertains. Further, the transmitting/receiving section 203 may be configured as an integrated transmitting/ receiving section or may be constituted by a transmitting section and a receiving section.

Figure 7:
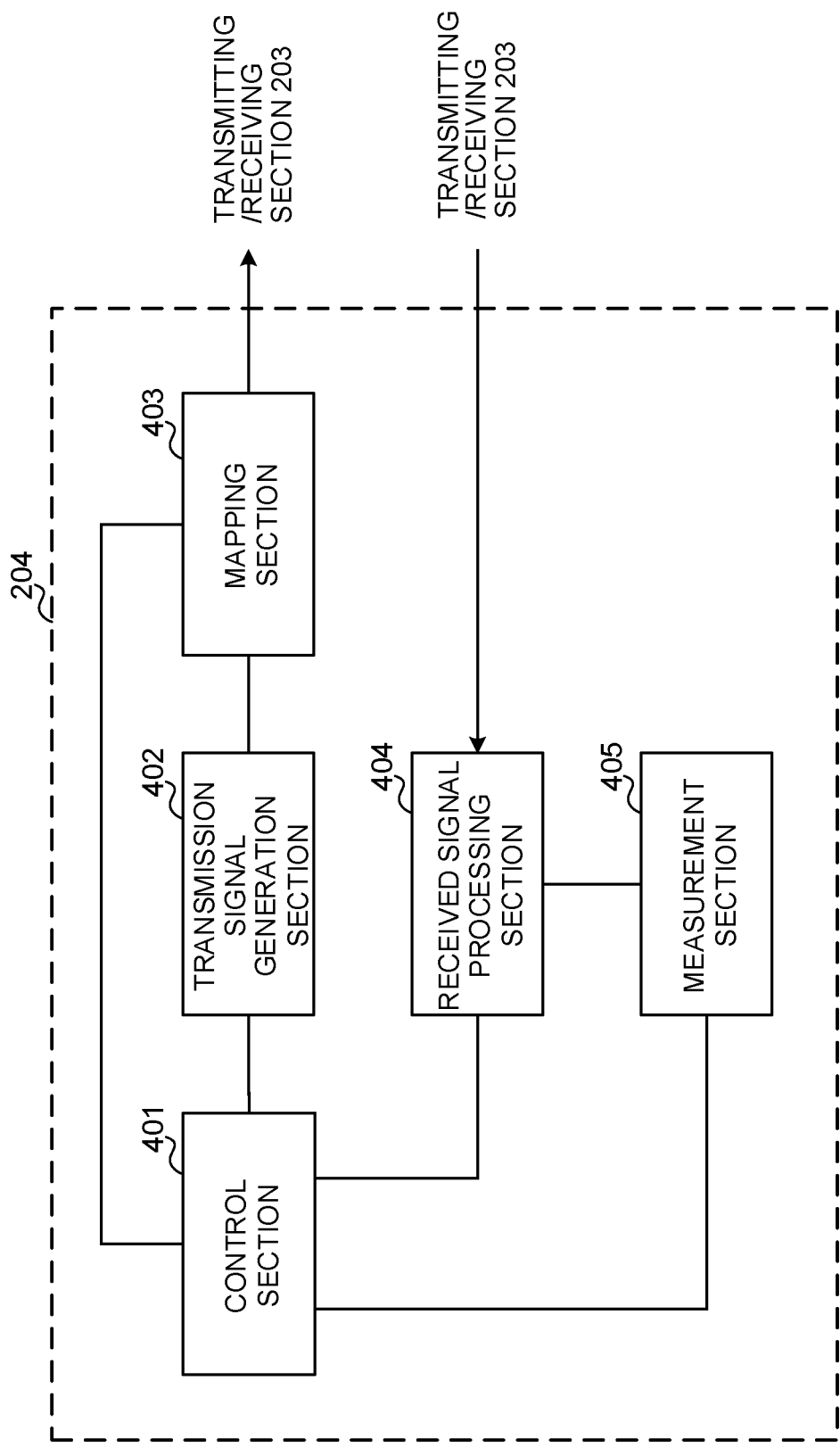
FIG. 7 is a diagram illustrating an example functional configuration of the user terminal according to this embodiment.

FIG. 7 is a diagram illustrating an example functional configuration of a user terminal according to this embodiment. In this figure, functional blocks that are characteristic portions of this embodiment are mainly illustrated, and the user terminal 20 also has other functional blocks required for radio communication. As illustrated in this figure, the baseband signal processing section 204 of the user terminal 20 includes a control section 401, a transmission signal generating section 402, a mapping section 403, a reception signal processing section 404, and a measuring section 405.

The control section 401 performs overall control of the user terminal 20. The control section 401 controls, for example, the generation of a UL signal using the transmission signal generating section 402, the mapping of the UL signal using the mapping section 403, reception processing of the DL signal using the reception signal processing section 404, and measurement using the measuring section 405.

The control section 401 also controls an uplink control channel to be used for the transmission of UCI from the user terminal 20 in accordance with an explicit instruction from the radio base station 10 or in accordance with an implicit determination made by the user terminal 20. The control section 401 also controls the transmission of the UCI.

The control section 401 may also control the configuration (format) of an uplink control channel (for example, long PUCCH and/or short PUCCH). The control section 401 may control the format of the uplink control channel based on control information from the radio base station 10. The control section 401 may also control the PUCCH format (format of an uplink control channel) to be used for the transmission of the UCI based on information related to fallback.

Further, the control section 401 may determine a single resource set from among a plurality of resource sets (for example, the first, second, third, and fourth PUCCH resource sets) configured based on higher layer signaling (for example, RRC signaling), and may determine a transmission resource (PUCCH resource) to be used for the uplink control channel (PUCCH) from within the single resource set based on a given field value in downlink control information (DCI). The number of resources (for example, M) included in the resource set may be smaller than 8.

Further, the control section 401 may configure a plurality of resource sets by using higher layer signaling. Each of the plurality of resource sets may include 0 resources or at least one resource. The control section 401 may determine the resource set from within the plurality of resource sets based on a length of the uplink control information.

Further, the control section 401 may determine, as the transmission resource, a resource corresponding to the given field value based on an association (for example, a table) between eight or more (for example, eight) resources and the given field value.

Further, the control section 401 may determine, as the transmission resource, a resource corresponding to the given field value based on an association (for example, a table) between less than eight (for example, four, two, or one) resources and the given field value.

Further, when downlink control information having a given field value corresponding to a resource not included in the resource set is detected, the control section 401 may not use the detected downlink control information.

When a higher layer parameter (maxNrofPUCCH-ResourcesPerSet) corresponding to a maximum number of uplink control channel resources per resource set is applied to all the plurality of resource sets and when the maximum number exceeds a given value (for example, 8), the control section 401 may determine that the maximum number of uplink control channel resources (PUCCH resources) per resource set other than a specific resource set (for example, the first PUCCH resource set) is the given number.

When the higher layer parameter (maxNrofPUCCH-ResourcesPerSet) is applied to all the plurality of resource sets and when the maximum number does not exceed the given value, the control section 401 may determine that the maximum number of uplink control channel resources per resource set other than the specific resource set is the maximum number.

The specific resource set may be a resource set for a format (for example, PUCCH format 0 and/or 1) to be used for the transmission of uplink control information (UCI) of up to 2 bits.

The control section 401 can be constituted by a controller, a control circuit, or a control apparatus, which is described based on common recognition in the technical field to which the present invention pertains.

The transmission signal generating section 402 generates (through, for example, coding, rate matching, puncturing, modulation, and so on) a UL signal (including a UL data signal, a UL control signal, a UL reference signal, and UCI) in accordance with an instruction from the control section 401 and outputs the UL signal to the mapping section 403. The transmission signal generating section 402 can be a signal generator, a signal generation circuit, or a signal generation apparatus, which is described based on common recognition in the technical field to which the present invention pertains.

The mapping section 403 maps the UL signal generated by the transmission signal generating section 402 to a radio resource in accordance with an instruction from the control section 401 and outputs the resulting signal to the transmitting/receiving section 203. The mapping section 403 can be a mapper, a mapping circuit, or a mapping apparatus, which is described based on common recognition in the technical field to which the present invention pertains.

The reception signal processing section 404 performs reception processing (for example, demapping, demodulation, decoding, and so on) on a DL signal (a DL data signal, scheduling information, a DL control signal, or a DL reference signal). The reception signal processing section 404 outputs information received from the radio base station 10 to the control section 401. The reception signal processing section 404 outputs, for example, notification information, system information, higher layer control information based on higher layer signaling such as RRC signaling, physical layer control information (L1/L2 control information), and so on to the control section 401.

The reception signal processing section 404 can be constituted by a signal processor, a signal processing circuit, or a signal processing apparatus, which is described based on common recognition in the technical field to which the present invention pertains. The reception signal processing section 404 can constitute a receiving section according to the present invention.

The measuring section 405 measures a channel state based on a reference signal (for example, CSI-RS) from the radio base station 10 and outputs a measurement result to the control section 401. The measurement of a channel state may be performed for each CC.

The measuring section 405 can be constituted by a signal processor, a signal processing circuit, or a signal processing apparatus and a measuring instrument, a measurement circuit, or a measurement apparatus, which are described based on common recognition in the technical field to which the present invention pertains.

(Hardware Configuration)

The block diagrams used to describe the embodiment described above illustrate blocks in units of functions. These functional blocks (constituent sections) are implemented by any combination of at least one of hardware and software. The implementation of each functional block is not limited to any specific method. That is, each functional block may be implemented using a single physically or logically coupled apparatus or may be implemented using a plurality of apparatuses such that two or more physically or logically separate apparatuses are connected directly or indirectly (by using, for example, wired connection, wireless connection, or the like).

Figure 8:
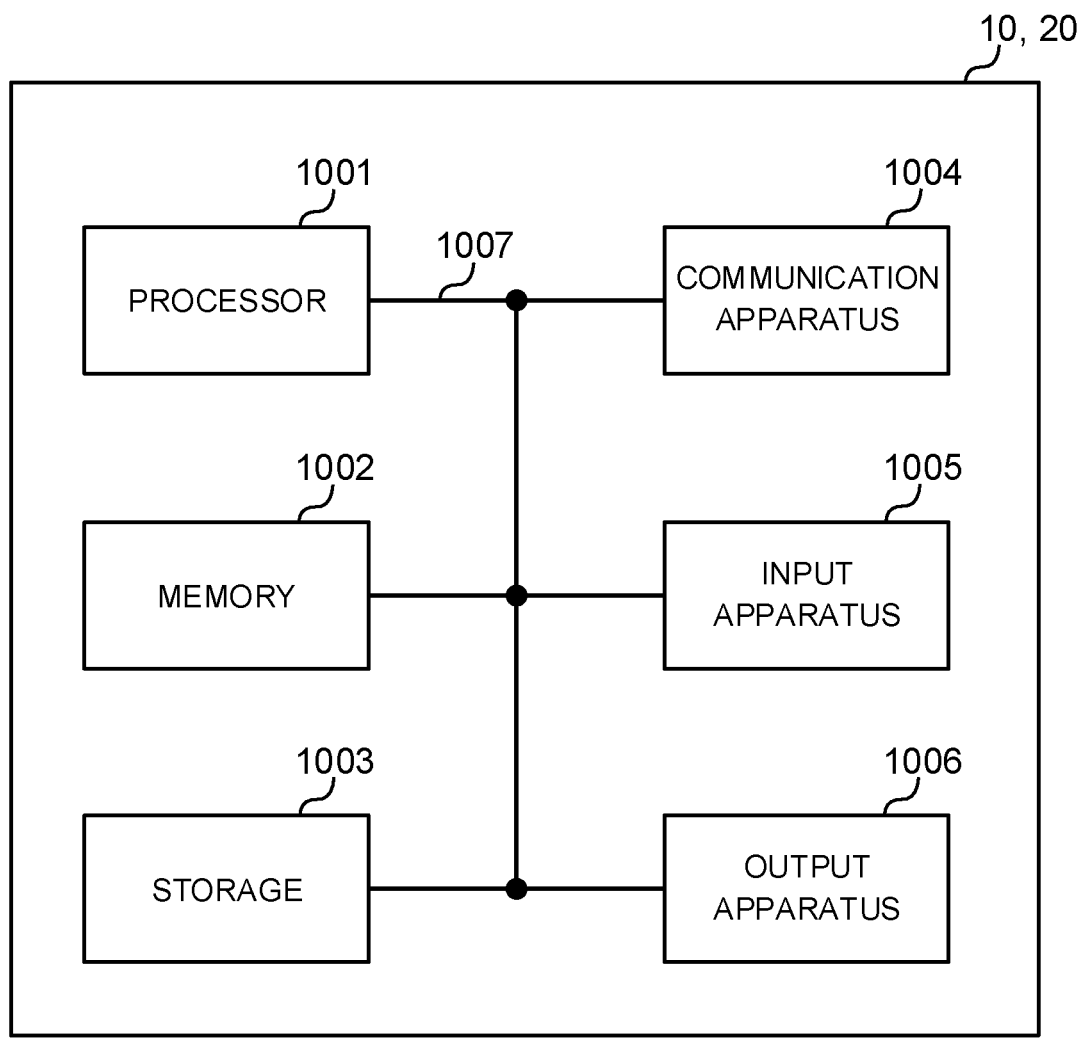
FIG. 8 is a diagram illustrating an example hardware configuration of the radio base station and the user terminal according to this embodiment.

For example, a radio base station, a user terminal, and so on according to an embodiment of the present disclosure may function as a computer that performs a process of a radio communication method of the present disclosure. FIG. 8 is a diagram illustrating an example hardware configuration of a radio base station and a user terminal according to an embodiment. The radio base station 10 and the user terminal 20 described above may be physically configured as a computer apparatus including a processor 1001, a memory 1002, storage 1003, a communication apparatus 1004, an input apparatus 1005, an output apparatus 1006, a bus 1007, and so on.

In the following description, the term "apparatus" may be read as "circuit", "device", "unit", or the like. The hardware configuration of the radio base station 10 and the user terminal 20 may be configured to include one or a plurality of apparatuses that correspond to each of the apparatuses illustrated in the figure, or may be configured not to include some of the apparatuses.

For example, a single processor 1001 is illustrated. However, a plurality of processors may be included. Further, processes may be executed by a single processor, or processes may be executed by one or more processors simultaneously, sequentially, or by using any other technique. The processor 1001 may be implemented by one or more chips.

The functions of the radio base station 10 and the user terminal 20 are implemented by, for example, loading given software (program) onto hardware such as the processor 1001 and the memory 1002 to allow the processor 1001 to perform an arithmetic operation to control communication through the communication apparatus 1004 or control at least one of reading and writing of data from and to the memory 1002 and the storage 1003.

The processor 1001 controls the entire computer by, for example, activating an operating system. The processor 1001 may be constituted by a central processing unit (CPU) including an interface with a peripheral apparatus, a control apparatus, an arithmetic apparatus, a register, and so on. For example, the baseband signal processing section 104 (204), the call processing section 105, and so on described above may be implemented by the processor 1001.

Further, the processor 1001 reads a program (program code), a software module, data, and the like from at least one of the storage 1003 and the communication apparatus 1004 into the memory 1002 and executes various processes in accordance with them. Examples of the program include a program for causing a computer to execute at least some of the operations described in the embodiment described above. For example, the control section 401 of the user terminal 20 may be implemented by a control program that is stored in the memory 1002 and that operates on the processor 1001, and the other functional blocks may also be implemented in a similar way.

The memory 1002 is a computer-readable recording medium and may be constituted by at least one of, for example, a ROM (Read Only Memory), an EPROM (Erasable Programmable ROM), an EEPROM (Electrically EPROM), a RAM (Random Access Memory), and any other suitable storage medium. The memory 1002 may be referred to as register, cache, main memory (main storage), or the like. The memory 1002 is capable of saving a program (program code), a software module, and so on that are executable to implement a radio communication method according to an embodiment of the present disclosure.

The storage 1003 is a computer-readable recording medium and may be constituted by at least one of, for example, a flexible disk, a floppy (registered trademark) disk, a magneto-optical disk (for example, a compact disc (such as a CD-ROM (Compact Disc ROM)), a digital versatile disc, or a Blu-ray (registered trademark) disc), a removable disk, a hard disk drive, a smart card, a flash memory device (for example, a card, a stick, or a key drive), a magnetic stripe, a database, a server, and any other suitable storage medium. The storage 1003 may be referred to as auxiliary storage.

The communication apparatus 1004 is hardware (transmitting/receiving device) for performing communication between computers via at least one of a wired network and a wireless network and is also referred to as, for example, network device, network controller, network card, communication module, or the like. The communication apparatus 1004 may be configured to include a high-frequency switch, a duplexer, a filter, a frequency synthesizer, and so on to implement, for example, at least one of frequency division duplex (FDD) and time division duplex (TDD). For example, the transmit/receive antenna 101 (201), the amplifying section 102 (202), the transmitting/receiving section 103 (203), the transmission path interface 106, and so on described above may be implemented by the communication apparatus 1004.

The input apparatus 1005 is an input device (for example, a keyboard, a mouse, a microphone, a switch, a button, a sensor, or the like) that accepts input from the outside. The output apparatus 1006 is an output device (for example, a display, a speaker, an LED (Light Emitting Diode) lamp, or the like) that implements output to the outside. The input apparatus 1005 and the output apparatus 1006 may be an integrated component (for example, a touch panel).

Further, apparatuses such as the processor 1001 and the memory 1002 are connected by the bus 1007 for communication of information. The bus 1007 may be configured as a single bus or may be configured as a set of buses different for apparatuses.

The radio base station 10 and the user terminal 20 may be configured to include pieces of hardware such as a microprocessor, a digital signal processor (DSP), an ASIC (Application Specific Integrated Circuit), a PLD (Programmable Logic Device), and an FPGA (Field Programmable Gate Array), and such pieces of hardware may be used to implement some or all of the functional blocks. For example, the processor 1001 may be implemented by using at least one of these pieces of hardware.

(Modifications)

The terms described in the present disclosure and the terms required for the understanding of the present disclosure may be replaced with terms having the same or similar meanings. For example, at least one of a channel and a symbol may be a signal (signaling). A signal may be a message. A reference signal may be abbreviated as RS (Reference Signal) and may be referred to as pilot, pilot signal, or the like depending on the standard applied. Further, a component carrier (CC) may be referred to as cell, frequency carrier, carrier frequency, or the like.

A radio frame may be constituted by one or a plurality of periods (frames) in the time domain. Each of the one or a plurality of periods (frames) that constitute a radio frame may be referred to as subframe. A subframe may be constituted by one or a plurality of slots in the time domain. A subframe may have a fixed time length (for example, 1 ms) that does not depend on the numerology.

The numerology may be a communication parameter to be applied to at least one of the transmission and reception of a certain signal or channel. The numerology may represent at least one of, for example, the subcarrier spacing (SCS), the bandwidth, the symbol length, the cyclic prefix length, the transmission time interval (TTI), the number of symbols per TTI, the radio frame configuration, specific filtering processing performed by a transmitter-receiver in the frequency domain, specific windowing processing performed by a transmitter-receiver in the time domain, and so on.

A slot may be constituted by one or a plurality of symbols (such as OFDM (Orthogonal Frequency Division Multiplexing) symbols or SC-FDMA (Single Carrier Frequency Division Multiple Access) symbols) in the time domain. A slot may be a time unit based on a numerology.

A slot may include a plurality of mini-slots. Each mini-slot may be constituted by one or a plurality of symbols in the time domain. Each mini-slot may be referred to as subslot. Each mini-slot may be constituted by symbols, the number of which is smaller than the number of slots. The PDSCH (or PUSCH) transmitted in a time unit longer than a mini-slot may be referred to as PDSCH (PUSCH) mapping type A. The PDSCH (or PUSCH) transmitted by using a mini-slot may be referred to as PDSCH (PUSCH) mapping type B.

A radio frame, a subframe, a slot, a mini-slot, and a symbol each represent a time unit for signal transmission. A radio frame, a subframe, a slot, a mini-slot, and a symbol may be each called by a different name.

For example, one subframe may be referred to as transmission time interval (TTI), a plurality of consecutive subframes may be referred to as TTI, or one slot or one mini-slot may be referred to as TTI. That is, at least one of a subframe and a TTI may be a subframe (1 ms) in the existing LTE, or may be a period (for example, 1 to 13 symbols) shorter than 1 ms or a period longer than 1 ms. The unit of TTI may be referred to as slot, mini-slot, or the like, rather than as subframe.

A TTI refers to, for example, the minimum time unit for scheduling in radio communication. For example, in an LTE system, a radio base station performs scheduling to allocate radio resources (such as the frequency bandwidth and the transmission power that can be used by each user terminal) to each user terminal in units of TTIs. The definition of TTI is not limited thereto.

A TTI may be a transmission time unit of a channel-coded data packet (transport block), code block, code word, or the like, or may be the unit of processing such as scheduling or link adaptation. When a TTI is given, a time interval (for example, the number of symbols) to which a transport block, a code block, a code word, or the like is actually mapped may be shorter than the TTI.

When one slot or one mini-slot is referred to as TTI, one or more TTIs (i.e., one or more slots or one or more mini-slots) may be the minimum time unit for scheduling. The number of slots (the number of mini-slots) that constitute the minimum time unit for scheduling may be controlled.

A TTI having a time length of 1 ms may also be referred to as regular (normal) TTI (TTI in LTE Rel. 8 to 12), normal TTI, long TTI, regular subframe, normal subframe, long subframe, or the like. A TTI shorter than a regular TTI may be referred to as shortened TTI, short TTI, partial or fractional TTI, shortened subframe, short subframe, mini-slot, subslot, or the like.

A long TTI (for example, a regular TTI, a subframe, or the like) may be read as a TTI having a time length exceeding 1 ms, and a short TTI (for example, a shortened TTI or the like) may be read as a TTI having a TTI length less than the TTI length of a long TTI and longer than or equal to 1 ms.

A resource block (RB) is the unit of resource allocation in the time domain and the frequency domain, and may include one or a plurality of consecutive subcarriers in the frequency domain.

An RB may include one or a plurality of symbols in the time domain and may have a length equal to one slot, one mini-slot, one subframe, or one TTI. One TTI and one subframe may be each constituted by one or a plurality of resource blocks.

One or a plurality of RBs may be referred to as physical resource block (PRB: Physical RB), subcarrier group (SCG), resource element group (REG), PRB pair, RB pair, or the like.

A resource block may be constituted by one or a plurality of resource elements (REs). For example, one RE may be a radio resource region of one subcarrier and one symbol.

The structures of the radio frame, subframe, slot, mini-slot, symbol, and the like described above are merely examples. For example, configurations, such as the number of subframes included in a radio frame, the number of slots per subframe or per radio frame, the number of mini-slots included in a slot, the number of symbols and RBs included in a slot or a mini-slot, the number of subcarriers included in an RB, and the number of symbols, a symbol length, and a cyclic prefix (CP) length in a TTI, can be variously changed.

Information, parameters, and the like described in the present disclosure may be represented by absolute values or relative values from given values, or may be represented using corresponding different information. For example, radio resources may be indicated by a given index.

In the present disclosure, names used for parameters and the like are not restrictive names in any respect. For example, various channels (such as PUCCH (Physical Uplink Control Channel) and PDCCH (Physical Downlink Control Channel)) and information elements can be each identified by any suitable name, and thus various names assigned to these various channels and information elements are not restrictive names in any respect.

Information, signals, and so on described in the present disclosure may be represented by using any of various different techniques. For example, data, instructions, commands, information, signals, bits, symbols, chips, and so on, which can be referred to across the entire above description, may be represented by voltages, currents, electromagnetic waves, magnetic fields or magnetic particles, optical fields or photons, or any combination thereof.

Further, information, signals, and so on can be output in at least one of a direction from a higher layer to a lower layer and a direction from a lower layer to a higher layer. Information, signals, and so on may be input/output via a plurality of network nodes.

Input or output information, signals, and so on may be saved in a specific location (for example, a memory) or may be managed using a management table. Input or output information, signals, and so on can be overwritten, updated, or additionally written. Output information, signals, and so on may be deleted. Input information, signals, and so on may be transmitted to any other apparatus.

Reporting of information is not limited to that in the aspects/embodiment described in the present disclosure and may be performed by using any other method. For example, reporting of information may be performed by using physical layer signaling (for example, downlink control information (DCI) or uplink control information (UCI)), higher layer signaling (for example, RRC (Radio Resource Control) signaling, broadcast information (master information block (MIB), system information block (SIB), or the like), MAC (Medium Access Control) signaling), any other signal, or any combination thereof.

Physical layer signaling may be referred to as L1/L2 (Layer 1/Layer 2) control information (L1/L2 control signal), L1 control information (L1 control signal), or the like. RRC signaling may be referred to as RRC message and may be, for example, an RRC connection setup message, an RRC connection reconfiguration message, or the like. MAC signaling may be reported by using, for example, a MAC control element (MAC CE).

Further, reporting of given information (for example, reporting of "X") is not limited to explicit reporting and may be performed implicitly (for example, by not reporting the given information or by reporting any other information).

A determination may be performed by using a value represented by 1 bit (0 or 1) or by using a true/false value (boolean) represented as true or false, or may be performed by comparison of numerical values (for example, comparison with a given value).

Software, regardless of whether it is referred to as software, firmware, middleware, microcode, or hardware description language or is referred to as any other name, should be broadly interpreted to mean instructions, instruction sets, codes, code segments, program codes, programs, sub-programs, software modules, applications, software applications, software packages, routines, sub-routines, objects, executable files, execution threads, procedures, functions, or the like.

Further, software, instructions, information, and the like may be transmitted or received via transmission media. For example, when software is transmitted from a website, a server, or any other remote source by using at least one of wired technology (such as a coaxial cable, an optical fiber cable, a twisted pair, or a digital subscriber line (DSL)) and wireless technology (such as infrared or microwave), at least one of such wired technology and wireless technology is included in the definition of transmission media.

As used in the present disclosure, the terms "system" and "network" can be used interchangeably.

In the present disclosure, terms, such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)", can be used interchangeably. A base station is sometimes referred to as terms such as macro cell, small cell, femtocell, and picocell.

A base station can accommodate one or a plurality of (for example, three) cells (also referred to as sectors). When a base station accommodates a plurality of cells, an entire coverage area of base station can be partitioned into a plurality of smaller areas, and each of the smaller areas is capable of providing a communication service by means of a base station sub-system (for example, an indoor small base station (RRH: Remote Radio Head)). The term "cell" or "sector" refers to a portion of or the entirety of the coverage area of at least one of a base station and a base station sub-system that provide a communication service over the coverage.

In the present disclosure, terms, such as "mobile station (MS)", "user terminal", "user apparatus (UE: User Equipment)", and "terminal", can be used interchangeably.

A mobile station is sometimes referred to as subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be referred to as transmitting apparatus, receiving apparatus, or the like. At least one of a base station and a mobile station may be an on-board device of a mobile object, the mobile object itself, or the like. The mobile object may be a vehicle (for example, a car, an aircraft, or the like), an unmanned mobile object (for example, a drone, an automatic vehicle, or the like), or a robot (of either the manned or unmanned type). At least one of a base station and a mobile station also includes an apparatus that does not necessarily move during communication operation.

In the present disclosure, a radio base station may be read as a user terminal. For example, the aspects/embodiment of the present disclosure may be applied to a configuration in which communication between a radio base station and a user terminal is replaced with communication between a plurality of user terminals (which may also be referred to as, for example, D2D (Device-to-Device), V2X (Vehicle-to-Everything), or the like). In this case, the user terminal 20 may be configured to have the functions of the radio base station 10 described above. Further, terms, such as "uplink" and "downlink", may be read as terms corresponding to inter-terminal communication (for example, "side"). For example, an uplink channel, a downlink channel, and the like may be read as a side channel.

In the present disclosure, likewise, a user terminal may be read as a radio base station. In this case, the radio base station 10 may be configured to have the functions of the user terminal 20 described above.

In the present disclosure, operations performed by a base station may be performed by its higher node (upper node) in some cases. It is apparent that in a network including one or a plurality of network nodes having a base station, various operations performed for communication with a terminal can be performed by the base station, one or more network nodes other than the base station (which may be, for example but not limited to, MME (Mobility Management Entity), S-GW (Serving-Gateway), or the like), or any combination thereof.

The aspects/embodiment described in the present disclosure may be used solely or in combination, or may be switched and used according to execution. The procedures, sequences, flowcharts, and the like according to the aspects/embodiment, which are described in the present disclosure, may be reordered so long as no inconsistency exists. For example, in the methods described in the present disclosure, various step elements are presented in illustrative order, and the order of the elements is not limited to the specific order presented herein.

The aspects/embodiment described above in the present disclosure may be applied to a system that uses LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or any other suitable radio communication method, an extended next-generation system based on them, or the like. The aspects/embodiment described above in the present disclosure may be applied to a combination of a plurality of systems (for example, a combination of LTE or LTE-A and 5G, or the like).

As used in the present disclosure, the expression "based on" does not mean "based only on" or "on the basis only of" unless otherwise noted. In other words, the expression "based on" means both "based only on" or "on the basis only of" and "based at least on" or "on the basis at least of".

As used in the present disclosure, any reference to elements with designations such as "first" and "second" does not generally limit the quantities or order of these elements. Such designations can be used in the present disclosure as a convenient method for distinguishing between two or more elements. Accordingly, references to first and second elements do not mean that only two elements can be employed or that the first element must precede the second element in some form.

As used in the present disclosure, the term "determining" may be used to include a variety of operations. For example, "determining" may be interpreted to mean "determining" of judging, calculating, computing, processing, deriving, investigating, looking up (for example, looking up in a table, a database, or a different data structure), ascertaining, or the like.

Further, "determining" may be interpreted to mean "determining" of receiving (for example, receiving information), transmitting (for example, transmitting information), input, output, accessing (for example, accessing data in a memory), or the like.

Further, "determining" may be interpreted to mean "determining" of resolving, selecting, choosing, establishing, comparing, or the like. That is, "determining" may be interpreted to mean "determining" some operation.

Further, "determining" may be read as "assuming", "expecting", "considering", or the like.

As used in the present disclosure, the terms "connected" and "coupled" or any modification thereof means any direct or indirect connection or coupling between two or more elements, and one or more intermediate elements may be present between two elements that are "connected" or "coupled" to each other. The coupling or connection between elements may be physical, logical, or a combination thereof. For example, "connection" may be read as "access".

In the present disclosure, when two elements are connected, the two elements may be regarded as being "connected" or "coupled" to each other by using one or more wires, cables, printed electrical connections, or the like and, as some non-limiting and non-inclusive examples, by using electromagnetic energy having a wavelength in the radio frequency range, the microwave range, or the light (both visible and invisible) range, or the like.

In the present disclosure, the expression "A and B being different" may be used to mean that "A and B are different from each other". Terms, such as "being separated" and "being coupled" may also be interpreted in a similar way.

In the present disclosure, when "include", "including", and modifications thereof are used, these terms are intended to be inclusive like the term "comprising". In addition, as used in the present disclosure, the term "or" is intended not to be exclusive or.

In the present disclosure, for example, when articles are added by translation, as in the case of "a", "an", and "the" in English, the present disclosure may include providing an interpretation in which such articles are followed by nouns that are in plural form.

While the invention according to the present disclosure has been described in detail, it is apparent to a person skilled in the art that the invention according to the present disclosure is not limited to the embodiment described in the present disclosure. The invention according to the present disclosure can be implemented as modified and changed embodiments without departing from the spirit and scope of the invention as defined by the claims. Therefore, the present disclosure is intended to provide illustrative descriptions and does not provide any restrictive meaning to the invention according to the present disclosure.

The invention claimed is:

1. A terminal comprising:
   a processor that determines a single resource set among a plurality of resource sets configured based on higher layer signaling and that determines a transmission resource for an uplink control channel from the single resource set based on a resource indicator field value in downlink control information; and
   a transmitter that transmits uplink control information by using the uplink control channel,
   wherein when a higher layer parameter corresponding to a maximum number of uplink control channel resources per resource set is applied to all the plurality of resource sets and when the maximum number exceeds a given value, the maximum number of uplink control channel resources per resource set other than a specific resource set is the given value.

2. The terminal according to claim 1, wherein when the higher layer parameter is applied to all the plurality of resource sets and when the maximum number does not exceed the given value, the maximum number of uplink control channel resources per resource set other than the specific resource set is the maximum number.

3. The terminal according to claim 1, wherein the specific resource set is a resource set for a format to use for transmission of the uplink control information of up to 2 bits.

4. The terminal according to claim 2, wherein the specific resource set is a resource set for a format to use for transmission of the uplink control information of up to 2 bits.

5. A radio communication method for a terminal, comprising:
   determining a single resource set among a plurality of resource sets configured based on higher layer signaling and determining a transmission resource for an uplink control channel from the single resource set based on a resource indicator field value in downlink control information; and transmitting uplink control information by using the uplink control channel, wherein when a higher layer parameter corresponding to a maximum number of uplink control channel resources per resource set is applied to all the plurality of resource sets and when the maximum number exceeds a given value, the maximum number of uplink control channel resources per resource set other than a specific resource set is the given value.

6. A base station comprising:

a processor that indicates a transmission resource for an uplink control channel from a single resource set by using a resource indicator field value in downlink control information, the single resource set being determined among a plurality of resource sets configured based on higher layer signaling; and a receiver that receives uplink control information by using the uplink control channel, wherein when a higher layer parameter corresponding to a maximum number of uplink control channel resources per resource set is applied to all the plurality of resource sets and when the maximum number exceeds a given value, the maximum number of uplink control channel resources per resource set other than a specific resource set is the given value.

7. A system comprising a terminal and a base station, wherein:

the terminal comprises:

a processor of the terminal that determines a single resource set among a plurality of resource sets configured based on higher layer signaling and that determines a transmission resource for an uplink control channel from the single resource set based on a resource indicator field value in downlink control information; and a transmitter that transmits uplink control information by using the uplink control channel, and the base station comprises:

a processor of the base station that indicates the transmission resource from the single resource set by using the resource indicator field value; and a receiver that receives the uplink control information by using the uplink control channel, wherein when a higher layer parameter corresponding to a maximum number of uplink control channel resources per resource set is applied to all the plurality of resource sets and when the maximum number exceeds a given value, the maximum number of uplink control channel resources per resource set other than a specific resource set is the given value.

* * * * *